United States Patent [19]

Kawamura et al.

[11] Patent Number: 4,931,864
[45] Date of Patent: Jun. 5, 1990

[54] IMAGE FORMING APPARATUS WHICH PERFORMS GAMMA CORRECTION ON THE BASIS OF A CUMULATIVE FREQUENCY DISTRIBUTION PRODUCED FROM A HISTOGRAM OF IMAGE DATA REPRESENTING A SELECTED AREA OF AN IMAGE

[75] Inventors: Hideaki Kawamura, Tokyo; Nobuaki Sakurada, Yokohama; Takashi Sasaki, Tokyo, all of Japan

[73] Assignee: Canon Kabushiki Kaisha, Tokyo, Japan

[21] Appl. No.: 412,608

[22] Filed: Sep. 27, 1989

Related U.S. Application Data

[63] Continuation of Ser. No. 348,120, May 3, 1989, abandoned, which is a continuation of Ser. No. 96,253, Sep. 8, 1987, abandoned, which is a continuation of Ser. No. 682,347, Dec. 17, 1984, abandoned.

[30] Foreign Application Priority Data

Dec. 27, 1983 [JP] Japan ................. 58-245969

[51] Int. Cl.$^5$ ............... G03F 3/08; H04N 1/38; H04N 1/40; H04N 1/46
[52] U.S. Cl. .................. 358/80; 358/32; 358/75; 358/164; 358/453; 358/458
[58] Field of Search .............. 358/75, 32, 76, 164, 358/77, 78, 80, 280, 284, 287, 453, 458

[56] References Cited

U.S. PATENT DOCUMENTS

| | | | |
|---|---|---|---|
| 3,459,888 | 8/1969 | Sokolov | 358/302 |
| 4,227,215 | 10/1980 | Gurley et al. | 358/160 |
| 4,335,399 | 6/1982 | Matsumoto | 358/80 |
| 4,338,636 | 7/1982 | Yamada et al. | 358/75 |
| 4,371,260 | 2/1983 | Yoshimoto et al. | 355/77 |
| 4,394,688 | 7/1983 | Iida et al. | 358/164 |
| 4,396,940 | 8/1983 | Tanaka et al. | 358/80 |
| 4,410,909 | 10/1983 | Ueda et al. | 358/75 |
| 4,450,482 | 5/1984 | Ackermann | 358/164 |
| 4,467,364 | 8/1984 | Konagaya | 358/76 |
| 4,472,736 | 9/1984 | Ushio et al. | 358/75 |
| 4,489,349 | 12/1984 | Okada | 358/32 |
| 4,496,983 | 1/1985 | Takenaka | 358/80 |
| 4,570,181 | 2/1986 | Yamamura | 358/160 |
| 4,614,977 | 9/1986 | Kawahara et al. | 358/280 |
| 4,667,228 | 5/1987 | Kawamura et al. | 358/80 |
| 4,782,384 | 11/1988 | Tucker et al. | 358/80 |

FOREIGN PATENT DOCUMENTS

| | | | |
|---|---|---|---|
| 3437748 | 4/1985 | Fed. Rep. of Germany | |
| 51-100627 | 9/1976 | Japan | |
| 53-76624 | 7/1978 | Japan | |
| 58-186264 | 10/1983 | Japan | 358/75 |

Primary Examiner—James J. Groody
Assistant Examiner—Randall S. Svihla
Attorney, Agent, or Firm—Fitzpatrick, Cella, Harper & Scinto

[57] ABSTRACT

An image forming apparatus for forming an image of a partial area of an entire image frame includes an apparatus for designating a part of a frame and apparatus for selecting an image formation operation for the predetermined area designated by the designating means or an image formation operation for the entire area. The image data corresponding to the predetermined area is read out and a histogram, indicating intensity distribution, is produced corresponding thereto. A gamma conversion characteristic is determined based on a cumulative frequency distribution produced from the histogram. The image data read out is converted in accordance with the determined gamma conversion characteristic. An image is formed on the basis of the converted image data representing the predetermined part of the frame or the entire frame. In such a partial printing, the contrast or gamma characteristic of the partial image may be appropriately corrected by a correction of the gamma characteristic according to the selection of the partial area.

34 Claims, 7 Drawing Sheets

IMAGE FORMING APPARATUS WHICH PERFORMS GAMMA CORRECTION ON THE BASIS OF A CUMULATIVE FREQUENCY DISTRIBUTION PRODUCED FROM A HISTOGRAM OF IMAGE DATA REPRESENTING A SELECTED AREA OF AN IMAGE

This application is a continuation of application Ser. No. 07/348,120 filed May 3, 1989, now abandoned, which was a continuation of application Ser. No. 07/096,253 filed Sept. 8, 1987, now abandoned, which was a continuation of application Ser. No. 06/682,347 filed Dec. 17, 1984, now abandoned.

BACKGROUND OF THE INVENTION

1. Field of the Invention

The present invention relates to an image forming apparatus, and more particularly an image forming apparatus capable of reproducing only a part from a frame of a video signal.

2. Description of the Prior Art

Conventional image forming apparatus generally prints out an entire frame even when only a part thereof is desired. There has therefore been desired an apparatus capable of printing only a part of a frame.

However, in case of printing only a principal object in the image signal of a frame in which said principal object is back lighted, the obtained image becomes generally dark and lacks tonal rendition. Such a situation occurs not only when the object is back lighted but also when the background contains brighter sky or objects of higher brightness, and the printed image shows satisfactory tonal rendition when the entire frame is printed but becomes dull when partially printed.

SUMMARY OF THE INVENTION

In consideration of the foregoing, an object of the present invention is to provide an image forming apparatus capable of providing an image of satisfactory tonal rendition even when only a part of a frame is printed.

The foregoing and other objects of the present invention will become fully apparent from the following description to be taken in conjunction with the attached drawings.

DETAILED DESCRIPTION OF THE PREFERRED EMBODIMENTS

Figure 1:
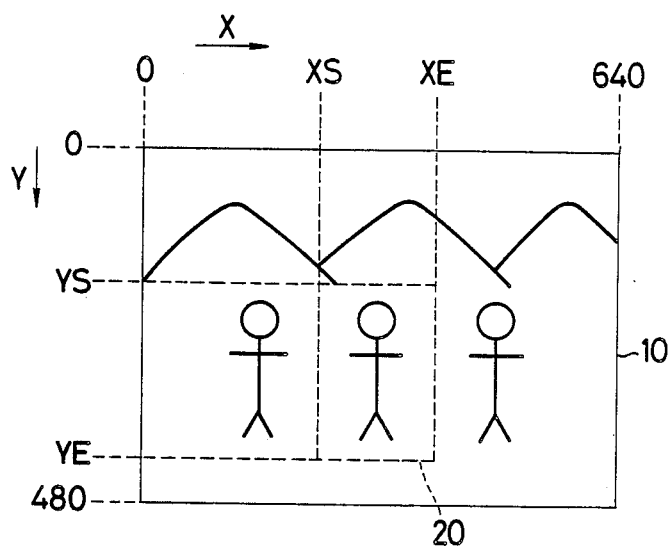
FIG. 1 is a view showing a television image.

FIG. 1 shows a television image, including an effective frame 10 and a partially trimmed frame 20. The effective frame 10 includes 640 and 480 sampling points respectively in the X and Y directions. The trimmed frame 20 is defined by points (XS, YS), (XE, YE) to be entered by an input device to be explained later.

Figure 2:
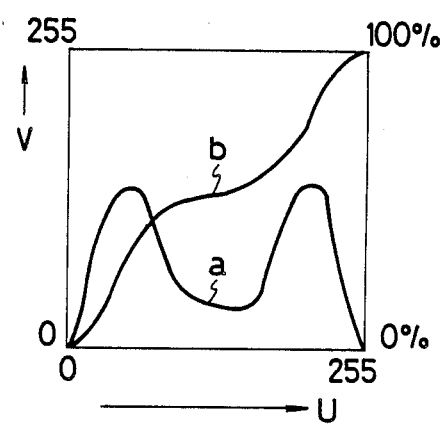
FIG. 2 is a chart showing a histogram and a cumulative curve of the luminance of an effective frame.
Figure 3:
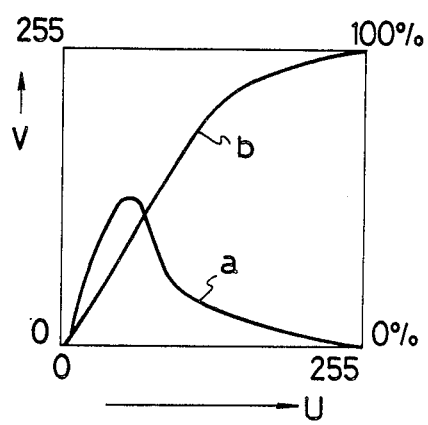
FIG. 3 is a chart showing a histogram and a cumulative curve of the luminance of a trimmed frame.

Curves a in FIGS. 2 and 3 respectively show the intensity distributions obtained by sampling the effective frame 10 and the trimmed frame 20. In FIGS. 2 and 3, the ordinate represents the intensity level, while the abscissa represents the number of frequency.

The intensity is digitized into levels 0–255, while the frequency is normalized into 0–255. On the other hand, the curves b represent cumulative frequency represented in percentage, and are used for gamma correction to be explained later.

Figure 4:
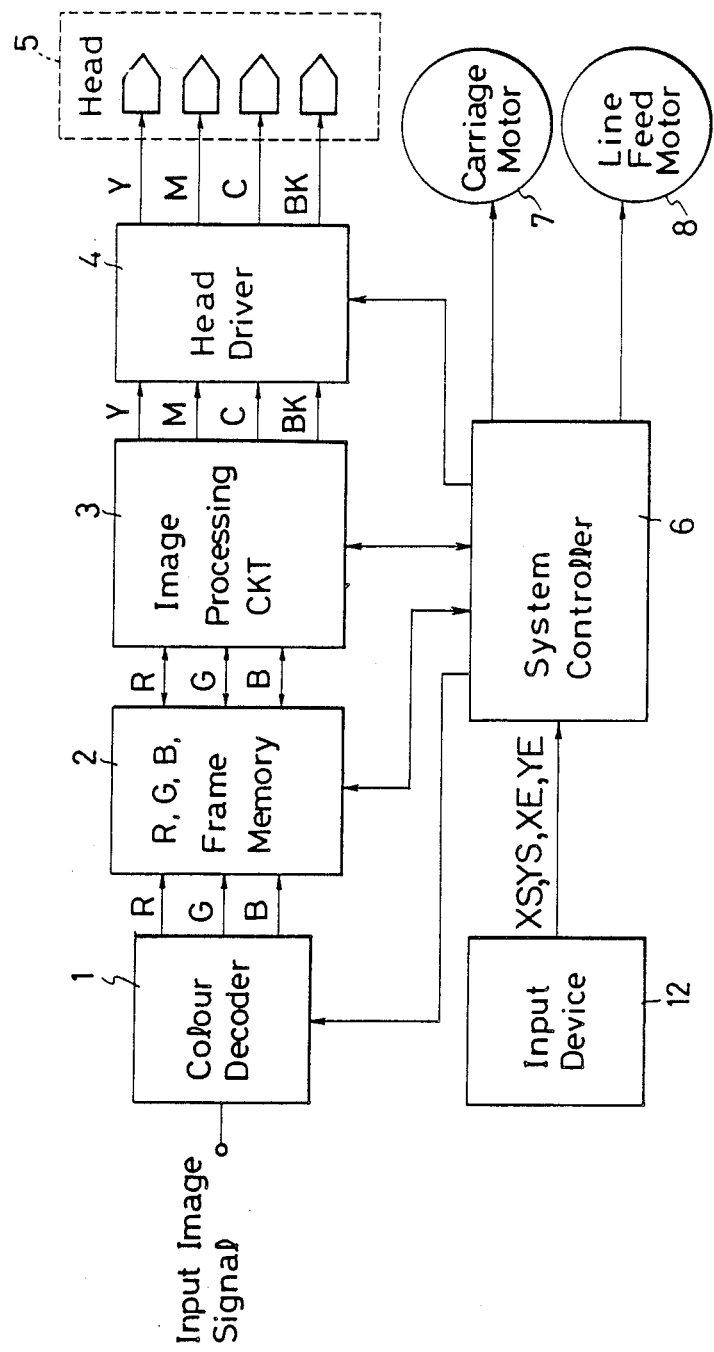
FIG. 4 is a block diagram of an image forming apparatus embodying the present invention.

FIG. 4 is a block diagram of an image forming apparatus embodying the present invention, wherein a color decoder 1 decomposes an input image signal, for example, a NTSC signal, into three additive original color signals, red R, green G, blue B and stores the signals R, G, B of a frame on a medium capable of frame recording, such as a frame memory 2. Frame memory 2 may be replaced by other media, for example laser disk, video tape or magnetic disk for analog recording, or floppy disk, magnetic disk or magnetic tape for digital recording after A/D conversion, as long as the effective pixel data of a frame can be supplied to an image processing circuit 3. Said image processing circuit 3 determines the intensity distribution on the data recorded in the frame memory 2, then calculates a cumulative intensity distribution curve and effects the aforementioned gamma correction. The details of these steps will be explained later in more detail in relation to FIGS. 5 to 8. The above-mentioned steps may also be effected in a system controller 6 to be explained later. The image processing circuit 3 also converts the signals R, G, B into subtractive original color signals of yellow Y, magenta M and cyan C, generates a black signal BK through the UCR process, and effects a masking process for avoiding the impurities in the inks to be employed.

A head driver 4 converts the density data of yellow Y, magenta M, cyan C and black BK, supplied from the image processing circuit 3, into voltages, which are supplied to a recording head 5 for image recording.

The system controller 6 controls the timing of various units shown in FIG. 4, including the timing of the voltages supplied to the recording head 5, and also controls a carriage motor 7 for driving the recording head and a line feed motor 8 for advancing the recording medium.

Also said system controller 6 receives a start coordinate (XS, YS) and an end coordinate (XE, YE) of the aforementioned trimmed frame from an input device 12 and supplies the same to the image processing circuit.

In the above-described structure, the input image signal is separated into the original color signals R, G, B, then converted into digital data of levels 0–255 and stored in the frame memory 2. Said color data represent white at R=G=B=255, or lighter colors at higher values. The intensity Y of the input image signal can be represented for example by an equation:

$$Y = 0.30R + 0.59G + 0.11B$$

and varies again in a range of 0–255. A curve a in FIG. 2 is a histogram of the intensity distribution represented by said equation over the entire frame to be recorded, for example over 640×480 dots in NTSC signal. Also a curve b in FIG. 2 shows a cumulative intensity distribution obtained from said histogram.

The abscissa U of said cumulative intensity curve is in a range 0–255 of the input intensity. If the coordinate V is also normalized to a range of 0–255, there is obtained a function $V=F(U)$, by which the value V can be obtained by gamma, conversion of the input intensity level U. In practice this function is stored as a table in the image processing circuit 3 or the system controller 6, and the output intensity is obtained by said table. The multiplication, addition, table conversion etc. for the above-mentioned process can be easily achieved by an arithmetic unit such as a microcomputer provided, for example, in the image processing circuit 3 or the system controller 6.

The actual recording of the input image signal may be conducted after determining the cumulative intensity distribution curve, and the above-mentioned gamma correction may be suitably changed according to the input image signal. Also it may be changed even in a frame, according to the position of the trimmed frame.

In the present embodiment, the above-mentioned cumulative intensity distribution curve is commonly used for the signals R, G and B to obtain an output image with a sufficient tonal rendition over the entire area, but it is also possible to adopt different cumulative distribution curves for the different colors.

It is furthermore possible to define upper and/or lower limits in the input data and to normalize the input data according to said limits.

Figure 5:
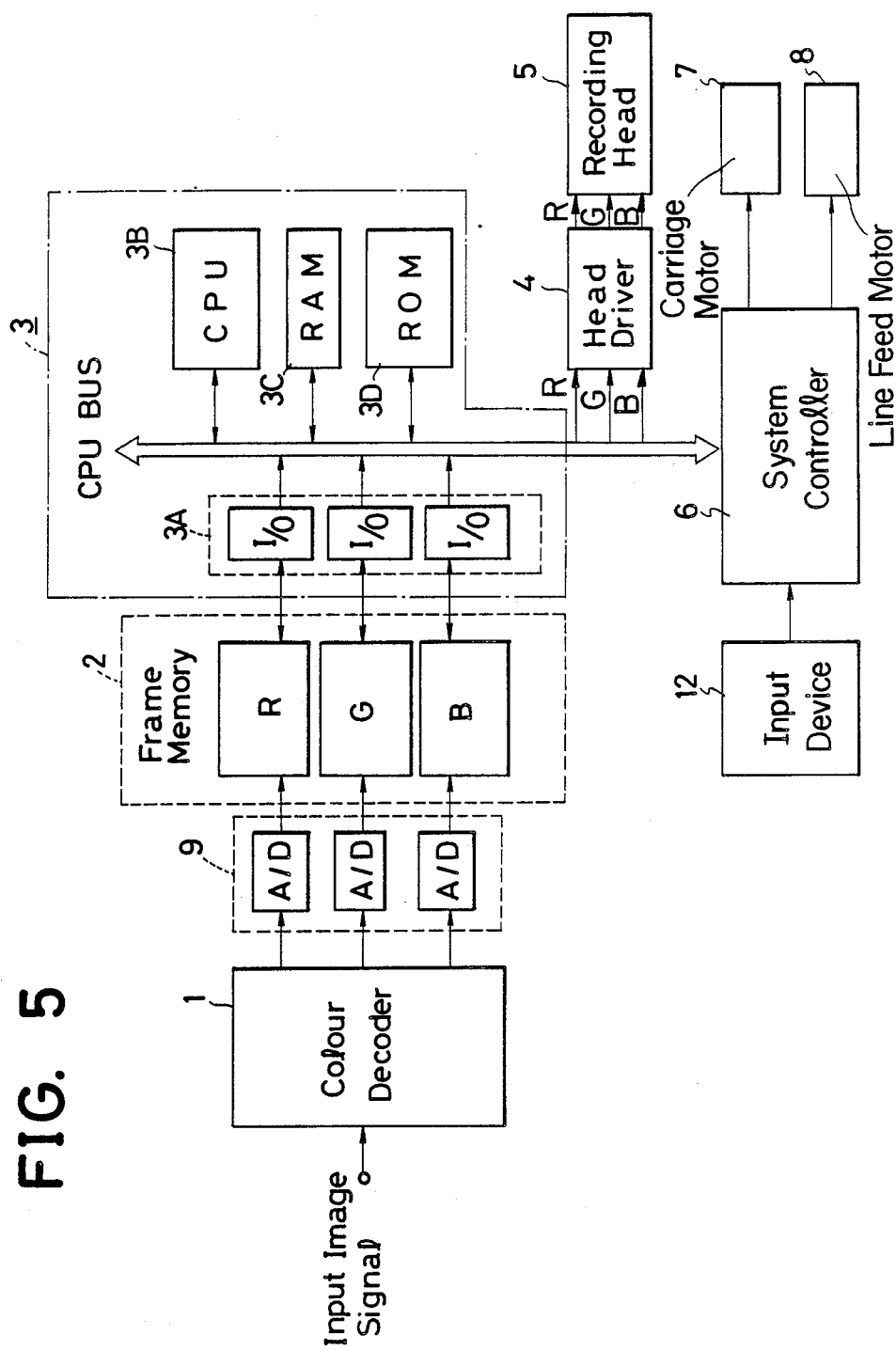
FIG. 5 is a block diagram of an apparatus for determining the luminance distribution and the cumulative luminance distribution in an embodiment of the present invention.

FIG. 5 shows an example of a device for determining the intensity distribution and the cumulative intensity distribution in the present embodiment, corresponding to the image processing circuit in FIG. 4. A central processing unit CPU-3B for effecting the aforementioned multiplication, addition, table conversion etc. and related units such as RAM-3C, ROM-30 etc. may be provided in the image processing circuit 3 or in the system controller 6 for controlling the function of said circuit 3. In the illustrated example it is provided in the image processing circuit 3.

In FIG. 5, the input color image signal is separated by a color decoder 1 into original color signals R, G, B, then converted by an A/D converter 9 into 8-bit data (0–255) and stored in a frame memory 2 in a form of 480×640 pixels per frame. The frame memory 2 is connected through an I/0 port 3A to a CPU 3B whereby pixel data can be arbitrarily stored or read by an address (x,y). Hereinafter the components R, G, B stored in the frame memory 2 are respectively represented by R(x,y), G(x,y) and B(x, y). The values x, y respectively represent the positions in the x- and y-directions and vary in ranges x=1–640 and y=1–480. A RAM 3C stores the data of intensity frequency distribution and of normalized cumulative frequency distribution, while a ROM 3D stores the control program. A head driver 4 is same as that shown in FIG. 4 and is provided with a D/A converter (not shown) and an amplifier for generating a voltage for driving a recording head 5, for each of the signals Y, M, C and BK.

Data indicating the position of the trimmed frame is supplied from the input device 12 to the image processing circuit 3 through the system controller 6.

Figure 6:
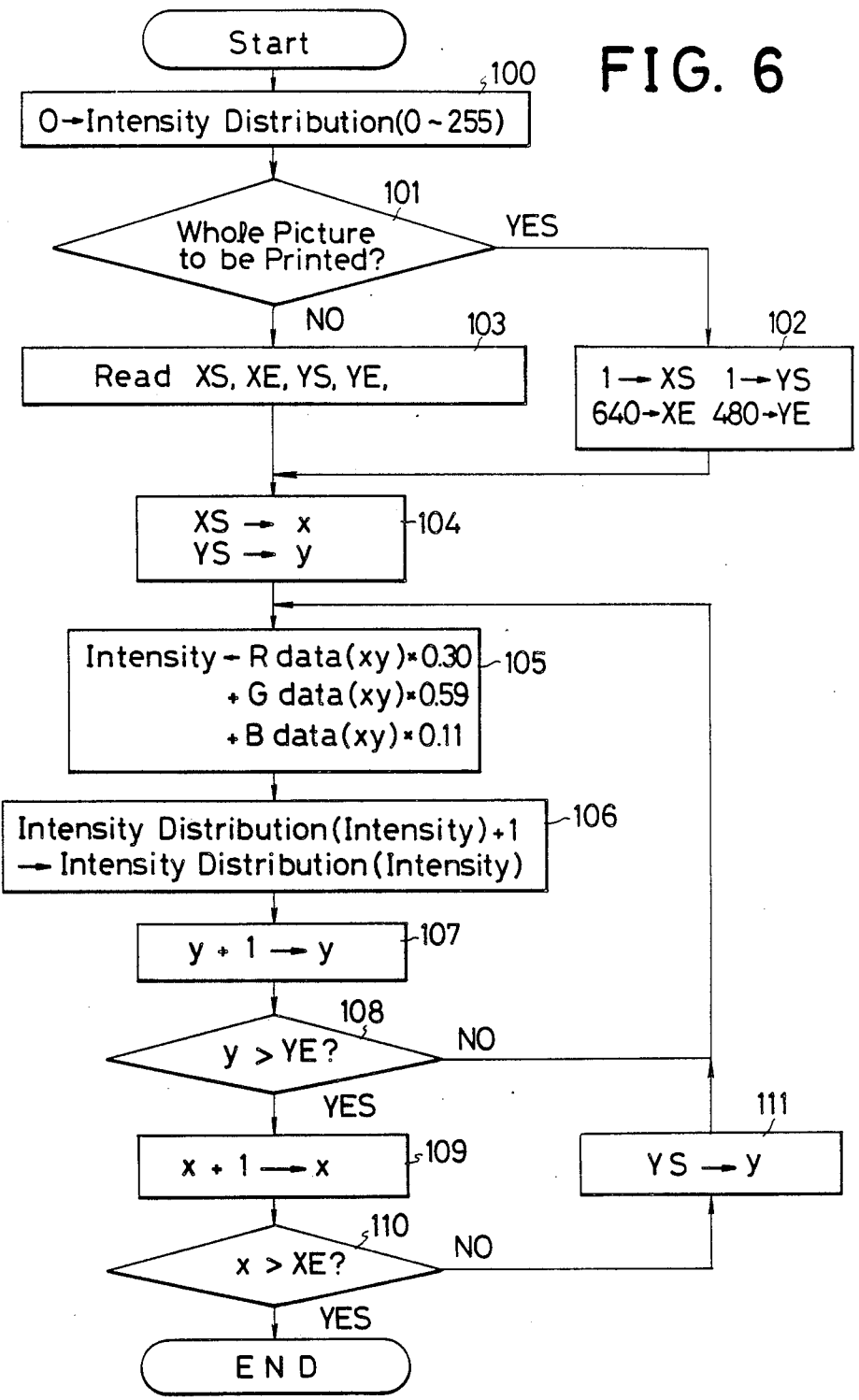
FIGS. 6 and 7 are flow charts showing the procedure for determining the luminance distribution and the cumulative luminance distribution in the apparatus shown in FIG. 5.

Now reference is made to FIG. 6 for explaining the procedure of determining the intensity distribution over the aforementioned effective frame or trimmed frame. In FIG. 6 "Intensity distribution" indicates the frequency of A/D converted intensity levels (0–255) of which corresponding data are stored in the RAM 3C shown in FIG. 5.

At first a step 100 clears the data area of the RAM 3C storing said frequency. Then a step 101 discriminates whether the entire effective frame or a trimmed frame is to be printed. In the former case, a step 102 stores "1" in the address XS, YS of a memory in the RAM 3C, likewise "640" in an address XE and "480" in an address YE. On the other hand, in the latter case, a step 103 reads data for XS, XE, YS, YE from the system controller 6 and stores said data into respective addresses. Then a step 104 performs initial setting for the loop count in the x- and y-direction, and a step 105 determines the intensity level from the data R, G, B according to the illustrated equation. Subsequently a step 106 adds "1" to the frequency corresponding to thus determined intensity level. A step 107 effects the loop counting in the y-direction, and, if y>YE is identified in a step 108, a step 109 effects the loop counting in the x-direction. Then, if x>XE is identified in a step 110, the determination of intensity distribution over the effective frame or the trimmed frame is completed. A step 111 is for initial setting for the loop counting in the y-direction.

Figure 7:
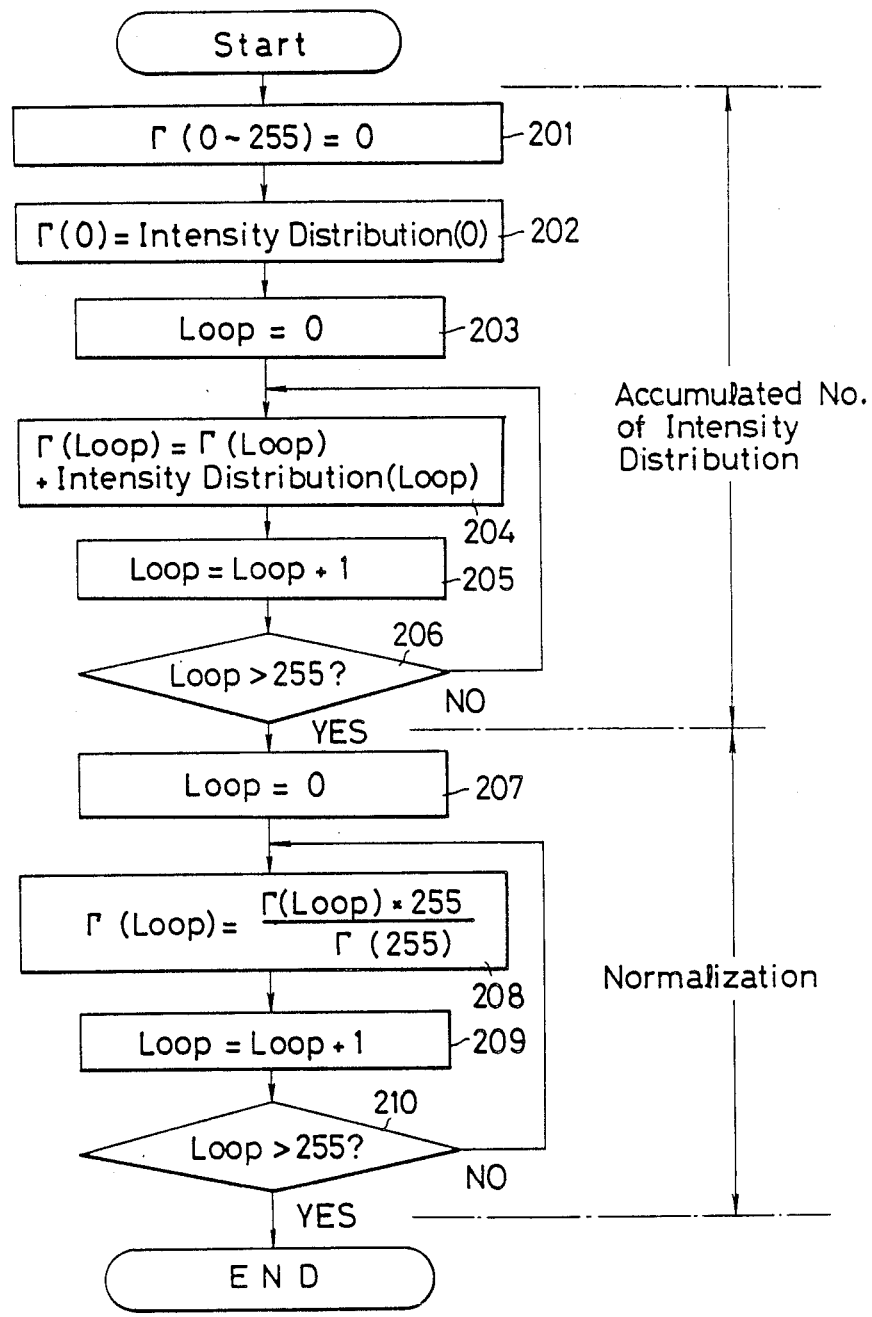

A flow chart shown in FIG. 7 is employed for determining the cumulative intensity distribution curve from the intensity distribution data obtained in the above-explained procedure. According to the present invention, the cumulative intensity distribution curve determined, for example, in the procedure of FIG. 7 is adopted as the gamma correction curve. In the flow chart shown in FIG. 7, steps 201–206 determine the cumulative number Γ of intensity distribution (0–255), while steps 207–210 normalize said cumulative number Γ. Said Γ (255) indicates the total cumulative number, which is equal to 640×480 for the entire effective frame with the aforementioned pixels, or equal to $(XE-XS+1)\times(YE-YS+1)$ for the trimmed frame. If the normalized values of Γ(0–255) as shown in the step 208 are stored as a table in the RAM 3C, the gamma conversion can be achieved by a table conversion: output=Γ(input), in which the input corresponds to the data in the frame memory 2 which the output corresponds to the normalized data 0–255. In the present embodiment the gamma correction is achieved by commonly applying the above-described conversion to the original signals R, G, B.

Again referring to FIG. 7, a step 201 clears a data area in the RAM 3C storing the cumulative number Γ(0–255). Then a step 202 initializes for the cumulative distribution, namely for the number for zero intensity, and a step 203 initializes for the loop counting. Then a step 204 adds the intensity distribution to the number or frequency corresponding to an immediately preceding loop. Then a step 205 adds "1" to the loop count, and the foregoing procedure is repeated until the loop count exceeds 255 in a step 206.

Then, for the aforementioned normalization, a step 207 performs initialization for the loop count, and a step 208 performs calculation for normalization. Then a step 209 adds "1" to the loop count, and the foregoing procedure is repeated until the loop count exceeds 255 in a step 210. The gamma correction curve is obtained in this manner.

Figure 8:
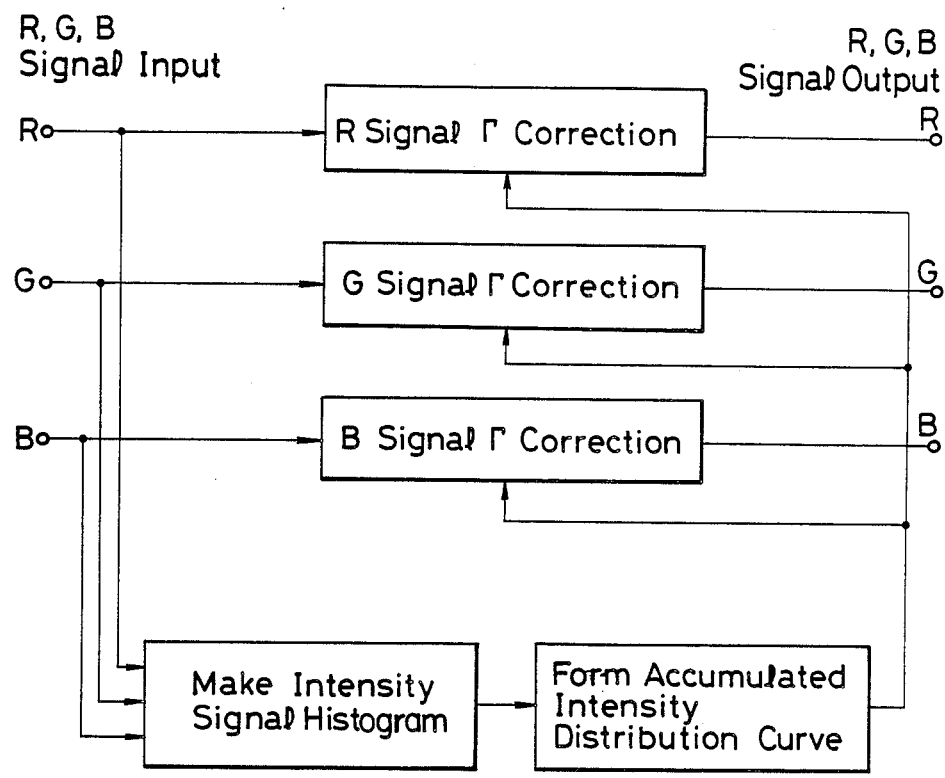
FIG. 8 is a functional block diagram of the apparatus shown in FIG. 5.

The gamma correction curve thus obtained is used, as shown in FIG. 8, for gamma correction for the color signals R, G, B by table conversion in the CPU 3B.

In case of a trimming, the image is formed according to the intensity distribution of the image within the trimmed frame, so that a high image quality with an appropriate tonal rendition is achieved also in the trimmed frame. Consequently, if a highlight area is removed from an image taken under a backlighted condition, the obtained output image does not become dark but shows a full tonal scale from a highlight area to a shadow area.

In the foregoing embodiment a histogram is prepared on the intensity level of the input image signal. A cumulative intensity distribution curve prepared from said histogram is used commonly for gamma correction of the original color signals R, G, B. However, according to the present invention, it is also possible to prepare a histogram on a color signal (for example R) or two color signals (for example R and G) and to use the resulting cumulative intensity distribution curve for gamma correction of all the original color signals, or of one or two color signals. Also the present invention can be applied to a black-and-white printer, in which case the intensity signal can be recorded as the input signal into the frame memory.

Figure 9:
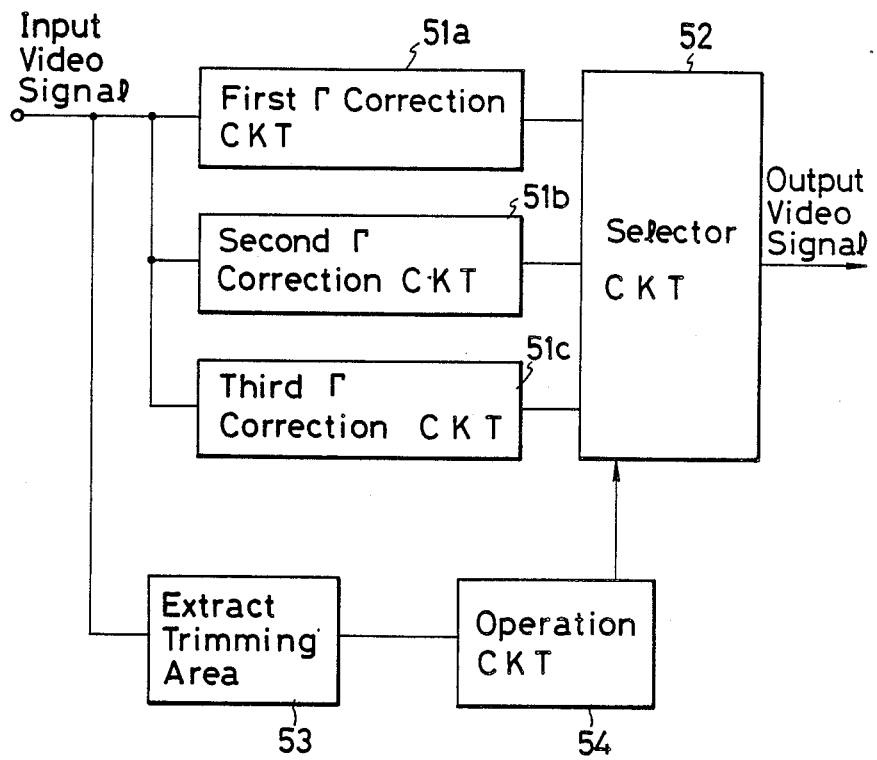
FIG. 9 is a functional block diagram of another embodiment.

In the foregoing embodiment, the gamma correction curve is automatically determined, but it is also possible, as shown in FIG. 9, to provide plural gamma correcting circuits 51a, 51b, 51c and to select either one of said circuits by means of a selector circuit 52 in case of frame trimming.

The present invention has been explained by an embodiment employing a video signal, but it is also applicable to other apparatus in which an image is converted into electrical signals and then reproduced, for example a digital copier or a facsimile.

As explained in detail in the foregoing, the present invention enables, in case of reproducing the image of a partial area of an image frame to achieve gamma correction corresponding to the image signal in said partial area, thus providing an appropriate image quality even for an image taken under a backlighted condition.

The present invention is not limited to the foregoing embodiments but is subject to various modifications within the scope and spirit of the appended claims.

What we claim is:

1. An image forming apparatus comprising:
   designating means for designating a partial area of a given image;
   selecting means for selecting the partial area of the given image which is designated by said designating means or the entire area of the given image;
   generating means for generating image data corresponding to the partial area or the entire area in accordance with the selection by said selecting means;
   determining means for determining a conversion characteristic of the image data corresponding to the partial area or the entire area generated by said generating means in accordance with a histogram of the image data;
   converting means for converting the image data corresponding to the partial area or the entire area generated by said generating means, in accordance with the conversion characteristic determined by said determining means; and
   image means for forming an image corresponding to the partial area or the entire area from the image data converted by said converting means;
   wherein said determining means determines a gamma conversion characteristic and said converting means performs a gamma conversion.

2. An image forming apparatus according to claim 1, wherein said determining means comprises histogram forming means for forming a histogram of the image data corresponding to the partial area or the entire area generated by said generating means.

3. An image forming apparatus according to claim 2, wherein said determining means is adapted to determine a cumulative distribution curve from said histogram and to adopt said cumulative distribution curve as the gamma conversion characteristic.

4. An image forming apparatus according to claim 1, wherein said image data generated by said generating means comprises image data for three colors, and said image forming means is adapted to form a color image.

5. An image forming apparatus according to claim 4, wherein said determining means comprises means for producing intensity data corresponding to the partial area or the entire area from the image data corresponding to the partial area or the entire area generated by said generating means.

6. An image forming apparatus according to claim 5, wherein said determining means further includes histogram forming means for forming a histogram of the intensity data.

7. An image forming apparatus according to claim 6, wherein said determining means further includes cumulative distribution calculating means for determining a cumulative distribution curve from said histogram.

8. An image processing apparatus comprising:
   designating means for designating a partial area of a given image;
   selecting means for selecting the partial area of the given image designated by said designating means or the entire area of the given image;
   means for preparing a histogram to obtain a frequency or occurrence of each of a plurality of brightness levels in a video signal representing the partial area or the entire area in accordance with the selection of said selecting means;
   means for obtaining a cumulative frequency of occurrence of each of said plurality of brightness levels in said video signal by obtaining, for each of said plurality of brightness signals, the sum of the frequencies of occurrence of all of the brightness levels from a predetermined one of said plurality of brightness levels up to and including the corresponding one of said plurality of brightness signals, said sums representing said cumulative frequencies of occurrence; and
   memory means for storing values corresponding to said cumulative frequencies of occurrence of said plurality of brightness levels, said memory means being used to perform a gamma correction operation on said video signal, said gamma correction operation being performed by addressing said memory means with said video signal and outputting the value corresponding to the cumulative frequency of occurrence of the brightness level of said video signal as a gamma-corrected video signal.

9. An image forming apparatus comprising:

memory means for storing image data corresponding to a given image;

designating means for designating a partial area of the given image;

reading means for reading out the image data corresponding to the partial area from said memory means;

determining means for determining a conversion characteristic of the image data read out by said reading means;

converting means for converting the image data corresponding to the partial area in accordance with the conversion characteristic determined by said determining means; and image forming means for forming an image corresponding to the partial area based on an output of said converting means.

10. An image forming apparatus according to claim 9, wherein said determining means determines a gamma conversion characteristic and said converting means performs a gamma conversion.

11. An image forming apparatus according to claim 9, wherein said determining means comprises histogram forming means for forming a histogram of the image data corresponding to the partial area read out by said reading means.

12. An image forming apparatus according to claim 9, wherein said image data stored by said memory means comprises image data for three color components, and said image forming means is adapted to form a color image.

13. An image forming apparatus according to claim 9, wherein said memory means stores image data for one picture.

14. An image forming apparatus according to claim 9, wherein said image forming means is an ink-jet recording device.

15. An image forming apparatus according to claim 9, wherein said converting means controls the level of said image data.

16. An image forming apparatus according to claim 9, wherein said image data includes image data for a plurality of color components, and said converting means performs conversion for each color component.

17. An image forming apparatus according to claim 9, wherein said converting means includes a plurality of conversion parts whose conversion characteristics are different from each other, and selects said conversion parts according to the determination of said determining means.

18. An image forming apparatus comprising:
reproducing means for reproducing an image;
conversion means for density conversion of an image signal representing the image;
regulating means for regulating the density conversion characteristic of said conversion means; and
designating means for designating a particular area of the image;
wherein said reproducing means is adapted to form an image of at least the particular area from the image signal, and wherein said regulating means regulates the density conversion characteristic of the conversion means in dependence on a portion of the image signal representing the particular area designated by said designating means.

19. An image forming apparatus according to claim 18, wherein said regulating means comprises sampling means for plural samplings of the image signal representing the particular area.

20. An image forming apparatus according to claim 19, wherein said regulating means further comprises histogram forming means for forming a histogram of sample values of said sampling means.

21. An image forming apparatus according to claim 20, wherein said regulating means is adapted to determine a cumulative distribution curve from the histogram and to adopt the cumulative distribution curve as the density conversion characteristic.

22. An image forming apparatus according to claim 18, 19, 20 or 21, wherein the image signal consists of three color signals and wherein said image reproducing means is able to form a color image.

23. An image forming apparatus according to claim 18, 19, 20 or 21, wherein the regulating means comprises setting means for setting a gamma conversion characteristic based on the portion of the image signal representing the particular area, and wherein said conversion means effects the density conversion of the image signal according to the gamma conversion characteristic set by said setting means.

24. An image forming apparatus according to claim 23, further comprising a memory for storing a portion of the image signal representing an effective area of the image.

25. An image forming apparatus according to claim 24, wherein the image signal represents a color image, and wherein said conversion means converts a tonal gradation of said color image.

26. An image forming apparatus according to claim 25, wherein said image signal is a television video signal.

27. An image forming apparatus according to claim 18, wherein the image signal consists of three color signals, wherein said image reproducing means is able to form a color image, and wherein the regulating means comprises means for determining an intensity signal from the three color signals.

28. An image forming apparatus according to claim 27, wherein the regulating means further comprises histogram calculating means for determining a histogram of levels of the intensity signal.

29. An image forming apparatus according to claim 28, wherein said histogram calculating means is adapted to determine the histogram from an intensity signal determined from the three color signals of the portion of the image signal representing the particular area.

30. An image forming apparatus according to claim 29, wherein the regulating means further comprises cumulative frequency distribution calculating means for determining a cumulative frequency distribution curve from the histogram determined by said histogram calculating means.

31. An image forming apparatus according to claim 30, wherein the regulating means further comprises setting means for setting a gamma conversion characteristic based on the cumulative frequency distribution curve, and wherein said conversion means effects the density conversion of the image signal according to the gamma conversion characteristic set by said setting means.

32. An image forming apparatus according to claim 31, further comprising a memory for storing a portion of the image signal representing an effective area of the image.

33. An image forming apparatus according to claim 32, wherein the image signal represents a color image, and wherein said conversion means converts a tonal gradation of said color image.

34. An image forming apparatus according to claim 33, wherein the image signal is a television video signal.

* * * * *